United States Patent [19]

Perkins et al.

[11] 4,063,306
[45] Dec. 13, 1977

[54] ACTIVELY SWITCHED DAMPING CIRCUIT

[75] Inventors: Donald W. Perkins, DeWitt, N.Y.; Marvin W. Smith, Roanoke, Va.

[73] Assignee: General Electric Company, Syracuse, N.Y.

[21] Appl. No.: 726,168

[22] Filed: Sept. 24, 1976

[51] Int. Cl.² .................................... H02M 1/18
[52] U.S. Cl. ............................... 363/17; 363/56; 363/98; 363/132
[58] Field of Search ............... 307/101; 321/2, 11–14, 321/45 R, 9 R, 45 ER; 363/17, 56, 98, 132

[56] References Cited

U.S. PATENT DOCUMENTS

| | | | |
|---|---|---|---|
| 3,207,974 | 9/1965 | McMurray | 321/45 R |
| 3,286,155 | 11/1966 | Corey | 321/45 C |
| 3,423,665 | 1/1969 | Greenberg et al. | 321/11 |
| 3,432,737 | 3/1969 | Hunter et al. | 321/2 |
| 3,437,908 | 4/1969 | Vincent | 321/45 ER |
| 3,794,906 | 2/1974 | Hoffman, Jr. et al. | 321/45 R X |
| 3,864,619 | 2/1975 | Tanaka et al. | 321/45 ER X |

*Primary Examiner*—William M. Shoop
*Attorney, Agent, or Firm*—C. W. Baker; R. V. Lang; F. L. Neuhauser

[57] ABSTRACT

This disclosure is of an inverter type power supply including an actively switched damping circuit for limiting voltage transients in the inverter circuitry. Such damping is accomplished by switching an energy absorbing element into parallel circuit relationship with the inverter transformer during periods in which transients normally occur, the energy absorbed during these transients then being either dissipated or stored and later returned to the inverter transformer for improved circuit efficiency.

1 Claim, 2 Drawing Figures

ACTIVELY SWITCHED DAMPING CIRCUIT

The Government has rights to this invention pursuant to Contract No. N00039-72-C-0356 awarded by the Department of the Navy.

BACKGROUND OF THE INVENTION

This invention relates generally to inverter type power supplies, and relates more particularly to such power supplies including an inverter transformer through which the current is periodically switched in operation of the inverter.

In such inverter circuits, during each half-cycle of inverter operation, the leakage reactance of the inverter transformer stores an appreciable amount of energy which can cause damaging voltage transients and which usually represents wasted power in the circuit. The existence of these transients necessitates the use of larger and higher-power rated components than would otherwise be required, causing a problem which tends to become progressively more troublesome at the higher inverter operating frequencies which are otherwise desirable for many applications.

Such voltage transients can be limited by use of passive linear damping networks, but their use significantly increases the power dissipation. Non-linear voltage suppressors may also be helpful, though these can only dissipate the stored energy and may not provide adequate control of peak voltages. It is of course highly desirable to minimize the voltage transients with minimal power loss, and if the stored energy can be returned to the circuit the efficiency will be still better.

SUMMARY OF THE INVENTION

The present invention has as its principal objective the provision of bridge type inverter circuits affording improved performance and circuit efficiency, through operation of an actively switched damping circuit permitting recovery of otherwise wasted power and suppression of otherwise potentially damaging voltage transients.

The basic inverter to which this invention has primary application may be of conventional bridge configuration, either half or full bridge. The damping network of the invention is connected in parallel with the inverter transformer primary winding, and comprises a capacitor or other energy absorbing element connected in series with an anti-parallel arrangement of two switchable unidirectionally conductive devices. Just prior to termination of each current pulse through the transformer primary, the unidirectional device of proper polarity to enable continuation of current flow through the winding in the same direction, is switched closed and held closed for a period sufficiently long to allow the inductive energy stored in the transformer to be transferred to the capacitor. In each succeeding half cycle current flows through the transformer winding in reversed direction, and selection of the unidirectional switch utilized is alternated between the two. Energy stored in the capacitor from previous cycles is transferred to the transformer and thus to the load during the period just following opening of the inverter drive switch in use. If desired the storage capacitor may be replaced by energy dissipating means such as a resistor.

BRIEF DESCRIPTION OF THE DRAWINGS

The invention, and its further objectives, features and advantages, will best be understood by reference to the following detailed description taken in conjunction with the accompanying drawings, wherein.

DESCRIPTION OF PREFERRED EMBODIMENT

Figure 1:
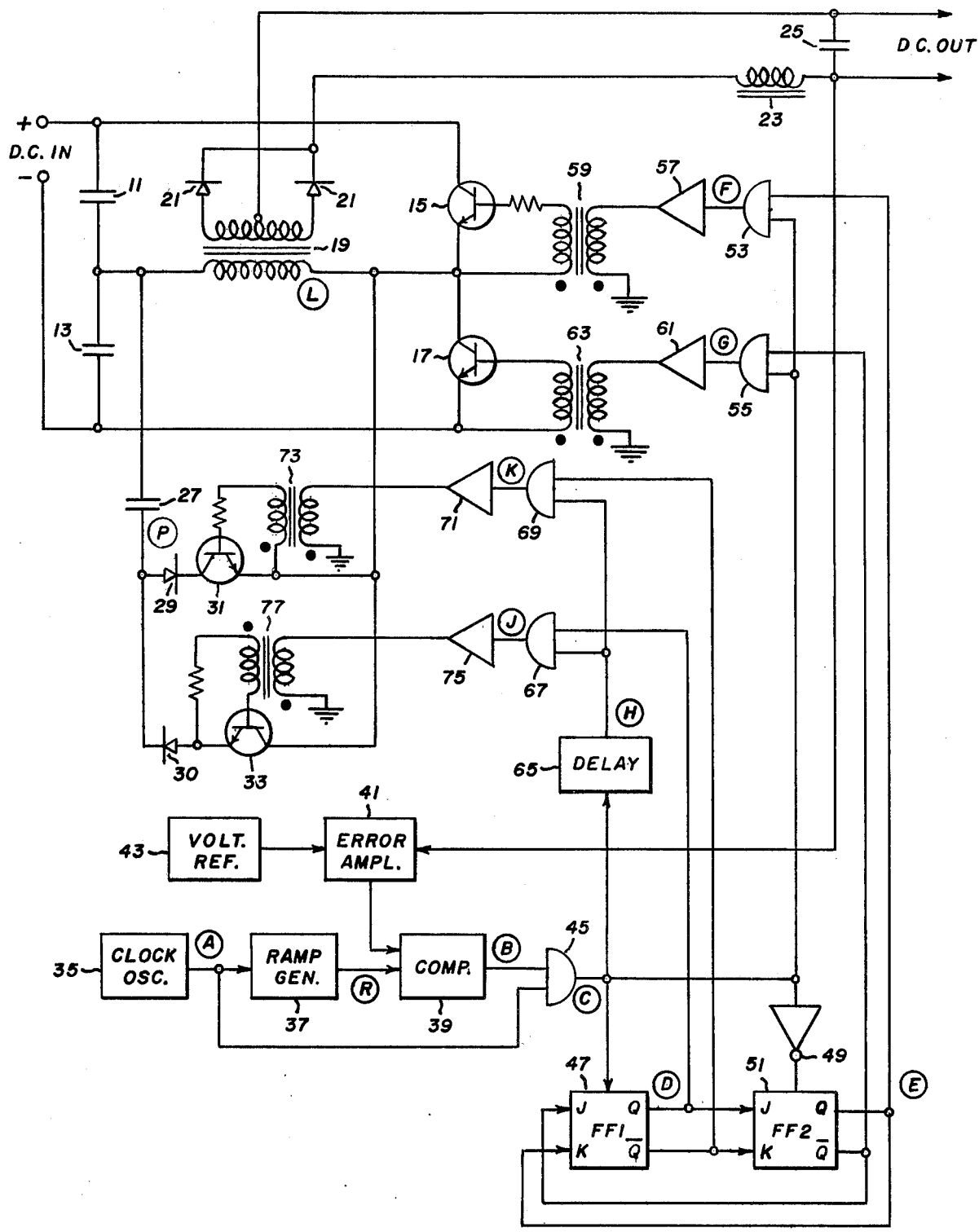
FIG. 1 illustrates an inverter circuit incorporating active damping in accordance with the invention, shown partially in a block diagram and partially in elementary circuit diagram form.

The invention is illustrated in FIG. 1 as applied to a half-bridge inverter circuit otherwise conventional in configuration. As shown, capacitors 11 and 13 are connected in each of two legs of the bridge, and current switch elements 15 and 17 are connected in each of the other two legs. These switch elements may take the form of power transistors as shown, or if preferred thyristors or other switch elements could be substituted. The dc input to the bridge is across two of its apices and the primary of the load transformer 19 is connected across the other two apices as shown. The center tapped secondary of this transformer is shown provided with rectifier means constituted by diodes 21 for conversion of the output to dc, with an LC filter comprising filter choke and capacitor elements 23 and 25, respectively, for smoothing the output. Of course, if ac output is desired these rectifier/filter elements may be omitted or retained for use only in connection with the load regulation circuitry to be described.

The active damping network in FIG. 1 comprises a capacitor 27, a pair of oppositely poled diodes 29-30 and a pair of unidirectionally conductive switch elements shown as switching transistors 31 and 33, with the diodes and switch elements connected as shown in an antiparallel arrangement and in series with capacitor 27. The network thus constituted is connected in parallel with the primary of the inverter transformer 19.

Both the switch elements 15-17 of the basic inverter and the switch elements 31-33 of the damping network are controlled by the drive circuitry constituted by the remainder of the circuitry of FIG. 1. As illustrated, a clock oscillator 35 having an output as represented by Waveform A in FIG. 2 applies that output to a ramp generator 37 to produce a sawtooth or linear ramp as represented by Waveform R in FIG. 2. This ramp is one of two inputs to a comparator 39, in which its amplitude is compared to the output of an error amplifier 41 to yield a narrower repetitive gating waveform such as represented at B (FIG. 2) when the error amplifier has an output level represented by the dotted line shown superimposed on Waveform R. The error amplifier 41 derives its output by comparison of the dc voltage level at the output of the inverter, against a reference dc voltage which may be provided by any convenient voltage source as indicated at 43.

Waveforms A and B, respectively produced by clock oscillator 35 and comparator 39, are applied as the inputs to an AND element 45 and produce an output as represented by Waveform C (FIG. 2), which provides the basic control input both to the inverter and to the damping network as will be explained. Waveform C is applied to the toggle input of a first-flop 47 and, after inversion at 49, to the same input of a second flip-flop 51, the two flip-flops being respectively designated FF1 and FF2 in FIG. 1. The rising edge of Waveform C causes flip-flop FF1 to change state so that it is in the opposite state from FF2, such relationship being maintained by the feedback of FF2 into the steering inputs J-K of flip-flop FF1. Waveform C also combines with whichever output of FF2 is positive at the time, to produce a drive gate for the inverter as will be explained.

Figure 2:
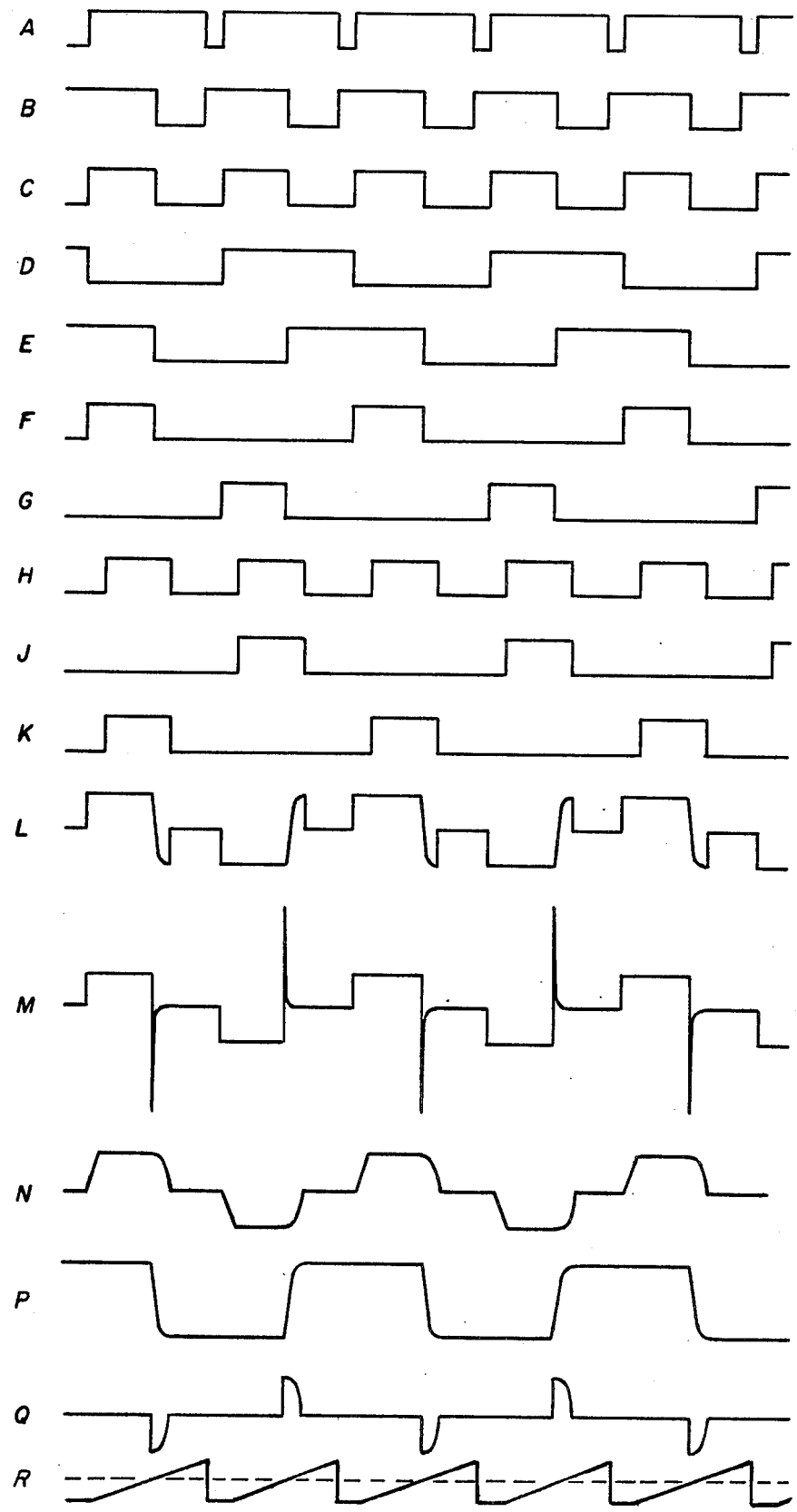
FIG. 2 illustrates waveforms at points in the circuit of FIG. 1 indicated by the corresponding letters.

As indicated by Waveform E in FIG. 2, the "Q" terminal output of FF2 is initially positive. This output accordingly combines with Waveform C, in an AND gate 53 to which both these inputs are applied, to produce a pulse as shown by Waveform F. This pulse is applied through a drive amplifier 57 and coupling transformer 59 to the base of transistor 15 to switch that transistor "on" and thus permit unidirectional current flow through the primary of the inverter transformer 19.

Waveform C also is passed through a delay network 65 to produce a signal, shown as Waveform H in FIG. 2, of similar form but with a time delay which is sufficient to encompass the turn-off time of the inverter though less than the off (negative) portion of the clock period. This delayed signal is logically combined in AND elements 67 and 69 with the "Q" and "Q" outputs of the flip-flop FF1. Initially, the one of these two outputs which will be high is the "Q" output, which is the same as Waveform D but inverted. The AND element 69 accordingly will produce a signal represented by Waveform K which is applied through amplifier 71 and coupling transformer 73 to the base of switching transistor 31. Since the FF1 output on line 2 is at this time low, or negative, the AND element 67 will, as indicated by Waveform J, produce no driving signal for application through amplifier 75 and coupling transformer 77 to the other switching transistor 33.

As will be apparent from FIG. 2, Waveform K goes positive shortly after Waveform F, the time difference here being determined by the delay element 65, and when K goes positive it switches transistor 31 on to provide a conductive path through series diode 29, capacitor 27 and the primary of the transformer 19. When transistor 31 first switches on, the right-hand end of the transformer primary winding, at the point marked "L", is positive as indicated by Waveform L. The adjacent plate of the capacitor 27 is positively charged, but not quite enough to turn on diode 29.

Subsequently, when Waveform F goes negative, transistor 15 switches off and the voltage at the right-hand end of the transformer primary winding starts to go negative. Since as previously indicated transistor 31 was switched on in response to Waveform K and remains on, diode 29 now turns on and the current that formerly was flowing through transistor 15 is diverted through transistor 31 and diode 29 to capacitor 27. This causes the capacitor to discharge, and when its voltage and the voltage at the right-hand end of the transformer primary winding reach zero, the transformer secondary voltage then is clamped by the action of the rectifiers 21 and filter choke 23.

However, due to the leakage reactance of the transformer and the large current flowing there will be stored in the transformer a significant amount of energy. This stored energy causes the right-hand end of the transformer primary winding to continue going negative as shown by Waveform L, permitting the stored energy to decay. In the process, that energy is transferred to capacitor 27, causing it to charge negatively to nearly the maximum voltage to which the adjacent end of the transformer primary winding was previously driven, but of course of the opposite polarity.

When the current in the transformer primary decays to zero, the voltage across the primary falls to zero, diode 29 turns off and capacitor 27 retains the voltage to which it was just charged. Transistor 31 then is turned off and the inverter is ready for the next half-cycle, which proceeds in the same manner but with opposite elements conducting. Such reversal is accomplished by operation of the flip-flop FF2, in which the falling edge of Waveform C toggles the flip-flop to its opposite state, the same state as flip-flop FF1 at this time. This places the opposite parts of the inverter into operation during the next half-cycle.

As previously noted, the rectifiers 21 and filter 23-25 on the transformer secondary convert the inverter output into a dc voltage which is compared to a fixed reference voltage by the error amplifier 41, which then applies its output to the comparator 39. If the output voltage falls below this reference voltage, there will be an output signal to the comparator of polarity and magnitude such as to cause an increase in the positive duty cycle as represented by Waveform B. This increases the duty cycle of the drive on the transformer primary and raises the average rectified and filtered voltage appearing on the output. The comparator is at equilibrium when the dc output is virtually the same as the reference voltage.

Summarizing the operation of the inverter circuit of the invention as just described, in the absence of the active damping network of the invention the voltage across the inverter transformer primary would be generally as shown by Waveform M. The rectifiers and L-C filter on the inverter transformer secondary forces the secondary voltage to collapse to zero very rapidly, but the primary current continues to flow and its gradual decay produces the large voltage spikes which characterize this waveform. These spikes could be limited in amplitude by placing a diode across each of the switching transistors 15 and 17 to prevent voltage reversal, but due to the finite turn off speeds of practical switch elements there would be very high peak power dissipation within the switches.

Provision of active damping in accordance with the invention removes the large voltage spikes of Waveform M and produces a transformer primary voltage waveform as shown at L as previously described. In operation of the damping circuit, if capacitor 27 is charged to the same potential as the capacitor 13 element in the input filter, and with transistor switch 17 closed, diode 30 will be on the verge of conduction when transistor switch 33 closes. On opening of the transistor switch 17, the current that was flowing through it finds an easy path through transistor switch 33, diode 30 and capacitor 27. The voltage on that capacitor will be driven linearly to zero because of the constant-current nature of the transformer secondary load, and at the zero voltage point the secondary voltage is clamped. The stored energy in the transformer then transfers to capacitor 27 in a sinusoidal manner until the current in the transformer primary winding reaches zero, at which time diode 30 turns off and the transformer primary voltage collapses to zero.

If capacitor 27 is the optimum value for the application, it will be charged again to the dc input voltage, but with the opposite polarity, ready for the following half-cycle of inverter operation to be sequenced through. The voltage on capacitor 27 will be of the form shown in Waveform P and its instantaneous current will be as represented by Waveform Q. The transformer primary current is shown in Waveform N.

At the end of each half cycle, the energy stored in capacitor 27 is transferred to the load and the capacitor then is recharged by the energy stored in the inverter transformer primary. There is theoretically no lost power due to leakage reactance, if the capacitor 27 is optimally matched to the inverter loading. If the inverter is operated at loadings substantially different from the design loading, the voltage waveform on the transformer primary will depart somewhat from that represented by Waveform L and the damping will depart to some extent from the optimum. However, the improved circuit efficiency and reduced voltage transients which are afforded by the damping network of the invention still are achieved in large part.

It will be noted that since decay of the transformer primary voltage is slowed substantially by operation of the damping network, the peak power dissipation in the switching transistors 15 and 17 is also greatly reduced. This minimizes their internal stresses.

If the major concern is the peak voltage across the switches at turn off, and electrical efficiency is of only secondary concern, the capacitor 27 may be replaced with a suitable low valued resistor which will dissipate the energy stored in the inverter transformer primary winding. The circuit will also operate in basically the same manner if the two capacitors 11 and 13 in their respective legs of the inverter bridge are replaced by power transistors which are identical to the switching transistors 15-17 and operated in synchronism therewith in the manner conventional to full bridge inverter systems.

In another possible modification the delay element 65 could be replaced by a one shot multivibrator. This produces a fixed width pulse which would start as Waveform C goes negative and which would, by design, be of width less than the width of the negative portion of Waveform A. Such pulse waveform then would cause transistors 31 and 33 to be turned on only during the time they are needed, specifically as transistors 17 and 15, respectively, are turned off, and would assure that the damping network is always off before the inverter turns on.

Finally, it should be noted that if thyristors are used in preference to the transistors 31 and 33, the diodes 29 and 30 may then be omitted as they would not be needed for protection of the thyristors against the back voltages across them. These and many other modifications may be made to the specific embodiment described in the foregoing without departing from the spirit and scope of the invention, which is defined in the appended claim.

What is claimed as new and desired to be secured by Letters Patent of the United States is:

1. In combination with an inverter type power supply including a bridge circuit across which is connected the primary winding of a load transformer for periodically reversed current flow therethrough under control of current switching means interposed in at least two legs of the bridge and operated in alternating sequence by first switch drive means; an active damping network for limiting voltage transients in the inverter comprising:
   a. an energy absorbing element;
   b. a pair of switchable oppositely unidirectionally conducting means connected in parallel relation with each other and connected both in series relation with said energy absorbing element to form a circuit;
   c. means connecting said damping circuit in parallel relation with said transformer primary winding; and
   d. second switch drive means synchronized with said first switch drive means for switching said oppositely unidirectionally conducting means in alternating sequence such that the unidirectionally conducting means of proper polarity to permit continuing flow of current in the transformer primary winding is switched closed just prior to the opening of the one said current switching means through which such flow was established.

* * * * *